Jan. 3, 1950     A. WARSHER     2,493,605
SERVOMOTOR CONTROL
Filed Dec. 20, 1947
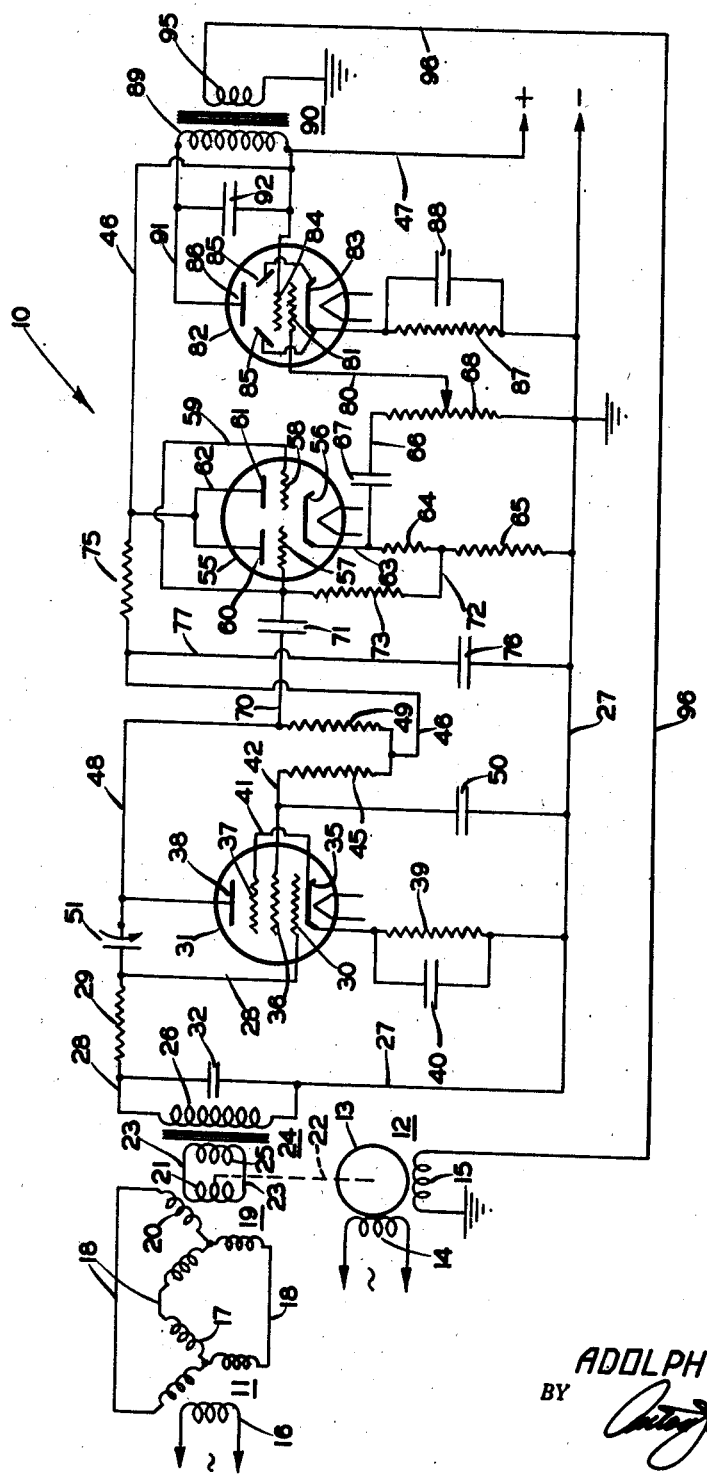
INVENTOR.
ADOLPH WARSHER
BY
- ATTORNEY -

Patented Jan. 3, 1950

2,493,605

UNITED STATES PATENT OFFICE 2,493,605

SERVOMOTOR CONTROL

Adolph Warsher, Maywood, N. J., assignor to Bendix Aviation Corporation, Teterboro, N. J., a corporation of Delaware Application December 20, 1947, Serial No. 792,885

17 Claims. (Cl. 318—30)

This invention relates to a motor control and more particularly to a servomotor control operative in response to displacement or error signal voltages in which the hunting and/or oscillations of the motor about a null position are effectively eliminated.

In prior practice, the operation of servomotors was damped by the inclusion in the control circuits thereof rate generators, time constant circuits and/or bridge circuits for deriving signal voltages responsive to speed of operation. The signal voltages derived from these various expedients were applied in opposition to the displacement signals initiating the motor operation to reduce the amplitude of such incoming signals so that the operation of the motor in response to such signals was slower. While such expedients did provide to a greater or lesser degree the desired damped operation of the controlled motor, such control devices were quite complicated, cumbersome and heavy in weight, and were not readily adapted for aircraft instrumentation.

It is an object of my present invention to provide an improved servomotor control in which hunting and/or oscillations of the motor about the null position are effectively eliminated which may be readily adapted for aircraft instrumentation where space and weight requirements are severely restricted.

A further object of the present invention is to provide a damped servomotor control in which the degree to which the core of a transformer is saturated determines the degree of servomotor damping.

Another object of this invention is to provide a damped servomotor control in which the impedance of a transformer is reduced to such a degree by the saturation of the core thereof that braking of the motor will occur at the instant of no displacement or error signal.

Still a further object of the invention is to provide a damped servomotor control in which the braking action of the motor is a function of the decrease of incoming error signal.

Still another object of my invention is to provide a damped servomotor control in which the objectionable harmonics of the fundamental frequency are attenuated to provide greater stability in operation.

Yet a further object of this invention is to provide a servomotor control circuit of the character described with novel means for saturating the core of a transformer, and for reducing the degree of saturation as the displacement signal increases in amplitude.

Yet another object of the invention is to provide a novel transformer useful in the damped servomotor control described.

And, another object of my invention is to provide a highly improved and compact damped servomotor control of the character described which shall consist of few and simply adjusted elements, relatively inexpensive to manufacture, automatic and positive in its action, which shall have a large variety of applications where light weight low-torque controls are desired, and yet be practical and efficient to a high degree in use.

Other objects of this invention will in part be obvious, and in part hereinafter pointed out.

Accordingly, I provide an electronic tube circuit in which miniature tubes of the 6AU6, 6J6, and 6AQ5 type are used. The biasing of the beam power tube is such that a static D. C. plate current is provided in the absence of A. C. error signals which is sufficient to saturate the core of a novel transformer. The direct current in the primary winding of the transformer will, due to the saturation, lower the effective impedance of the transformer when viewed from the terminals of the secondary winding. A two phase induction motor operated in response to the displacement signals has one phase connected across the transformer secondary, and the other phase excited from a suitable voltage source. The low impedance of the transformer secondary, in effect, short circuits the variable or signal phase of the motor. The cross induction by the fixed phase will result in a magnetic field being set up in the variable phase which is opposite to that of the field creating it. The motor is thus effectively braked by the opposing magnetic fields.

As the signal voltage increases in amplitude, the D. C. component of the plate current saturating the core is reduced, thereby increasing the impedance of the transformer secondary. At full signal the output impedance of the transformer equals that of the motor, in which case maximum power transfer will take place.

The circuit hereinafter described is also characterized by the use of a pentode having a sharp cut-off used as an error signal amplitude limiter, and a cathode follower or impedance transformer. The pentode is desirable in order to obtain a high degree of amplification of small displacement error signals, while the cathode follower is required to lower the impedance of the pentode output so that the voltage therefrom can be fed to the power amplifier grid, the latter of much lower impedance than the pentode output load, without serious loss of signal voltage.

Referring now in detail to the single figure of the drawing forming a part of this specification in which one of the various possible illustrative embodiments of my invention is shown in schematic wiring diagram form, the numeral 10 designates an electronic control circuit interconnecting a signal voltage source 11, herein shown as an inductive transmitter, and a two phase induction motor 12 adapted to be operated in response to the signals of said source. The induction motor 12 comprises a rotor 13, a "fixed" phase 14 connected across a suitable source of alternating current, and a "variable" phase 15 connected to the output of the control circuit 10.

The transmitter 11 forms a part of the input of the control circuit 10 and may comprise of a single phase rotor winding 16 connected across a suitable source of potential, and a three phase stator winding 17. The transmitter 11 is connected by leads 18 to a receiver 19 which may also comprise of a three phase stator winding 20 and a single phase rotor winding 21.

As is well known in the art, the angular displacement of the transmitter rotor 16 will induce a displacement or error signal in the receiver rotor 21. The error signal voltage appearing across the receiver rotor winding is impressed on the control circuit 10 and operates the servomotor 12 to drive the receiver rotor through a suitable linkage or reduction gear indicated at 22, into positional agreement with the transmitter rotor 16. The two rotors being in null position, no error signal is impressed on the control circuit 10; the servomotor operation being halted without hunting or oscillating about the null position due to the circuit components of the circuit 10.

The receiver rotor 21 is connected to the control circuit 10 by way of leads 23 and an impedance matching transformer 24. The primary winding 25 of the transformer is connected across the receiver rotor while the secondary winding 26 is connected at one end to a grounded lead 27 and at the other end by a lead 28 through a resistor 29 to the control grid 30 of a sharp cut-off pentode 31. A condenser 32 connected across the secondary winding 26 provides a resonant input circuit which is resonant at the frequency of the voltage source.

The pentode 31 comprises an indirectly heated cathode 35, the control grid 30, a screen grid 36, a suppressor grid 37, and a plate 38. The cathode 35 is connected through the usual bias resistor 39 and by-pass condenser 40 to the grounded lead 27, and by a lead 41 to the suppressor grid 37. The screen grid 36 is connected by way of a lead 42 through a voltage-dropping resistor 45 to B+ supply through two leads 46 and 47. The pentode plate 38 is also connected to the B+ supply by a plate lead 48, through a high resistance plate load resistor 49 and by the leads 46, 47. A by-pass condenser 50 interconnects the screen grid lead 42 and the grounded lead 27 to provide a low impedance path to ground for any alternating currents in the screen grid circuit.

The pentode 31 acts as a limiter due to its sharp cut-off characteristic to limit the degree of amplification of the error signals impressed thereon. Small error signals will be amplified to a great extent by the pentode while larger signals will be amplified to a definite limit, the voltage drop available across the plate resistor 49 being limited to a predetermined maximum.

The second harmonic of the signal voltage tends to cause erratic servomotor operation in response to the signals. As will hereinafter be more fully understood, motor operation due to the second harmonic voltage is possible under no signal conditions. To provide for stability of motor operation, a degenerative feed-back circuit is provided for the limiting pentode 31 by the inclusion of a condenser 51 connected between the plate lead 48 and the grid lead 28. Since the impedance of a condenser decreases as the frequency increases, a greater proportion of the second harmonics appearing in the plate circuit will be impressed on the grid than of the fundamental frequency. The feed back being 180° out of phase will tend to repress the undesired harmonic in the signal voltages.

Due to the high impedance output circuit of the pentode 31, a cathode follower is provided to offer low impedance input to the succeeding stage of amplification.

The cathode follower is essentially an impedance matching device and is sometimes referred to as an impedance transformer. The follower comprises a duo-triode tube 55 having an indirectly heated cathode 56, two control grids 57 and 58 interconnected by a lead 59, and two plates 60 and 61 interconnected by a lead 62. The cathode 56 is connected by a lead 63 through the tapped cathode circuit resistors 64 and 65 to the grounded lead 27.

The grids 57 and 58 of the duo-triode are connected by a lead 70 through a condenser 71 to the plate resistor 49, and by a lead 72 through a grid resistor 73 to the tap on the cathode resistor 64, 65. The bias is thus reduced by the termination of the grid resistor at a more positive point than the grounded lead 27. Negative signals of higher amplitude are thus accommodated by the cathode follower without the effects of cut-off limiting.

The plates 60 and 61 of the triode 55 are connected by the leads 46 and 47 to the B+ supply. When a positive signal is applied to the grids 57, 58 the rise in plate current through the cathode resistor 68 produces a greater voltage drop, making the cathode 56 more positive. A negative signal voltage applied to the grids will decrease the voltage drop across the resistor making the cathode less positive. The voltage across the resister 68 thus follows the grid voltage, the output voltage being essentially distortionless.

The error signals developed by the displacement of the transmitter rotor 16 have thus been greatly amplified by the action of the pentode 31, the second and higher harmonics of the signal voltage being attenuated by the inverse feed back circuit provided, and the signals now appear across a circuit of low impedance due to the cathode follower, the output and input signal voltages being of the same polarity.

The signal portion of the voltage appearing across the cathode resistor 64, 65 is now impressed by a lead 66 through the blocking condenser 67 on the gain control 68 and a portion thereof through lead 80 onto the control grid 81 of a beam power tube 82. The tube 82 comprises an indirectly heated cathode 83, the control grid 81, a screen grid 84, deflector plates 85 and plate 86. The cathode 83 is connected through a bias resistor 87 and a by-pass condenser 88 to the grounded lead 27, and by the usual internal connections to the deflector plates 85. The screen grid 84 is connected to B+ supply by the lead 47 and to one terminal of the primary winding 89 of an output transformer 90. The plate 86 is connected by a lead 91 to the other end of the primary winding 89 and therethrough to the B+ supply by the lead 47. A condenser 92 connected in parallel across the primary winding 89 provides a tuned output load impedance for the tube at the signal frequency. The secondary winding 95 of the output transformer is connected through ground and by a suitable lead 96 to the variable phase 15 of the servomotor 12.

The tube 82 is biased so that when no error signal is impressed on the control circuit 10, a D. C. plate current is provided which is high enough to saturate the core of the output transformer 90. The low coupling between the primary and secondary windings 89 and 95 due to the saturated core, provides a secondary having a low impedance. The secondary winding being connected to the variable phase of the servomotor 12 is analogous to the servomotor being operated with the variable phase short circuited. The motor 12 is thus provided with an excited phase 14 and the short circuited phase 15. The cross induction of the variable phase by the excited phase being of opposite instantaneous polarity effectively brakes the servomotor.

As the signal voltages appear across the grid resistor 68 and increase in amplitude, the cathode bias of the tube 82 increases to reduce the static plate current in the primary winding 89. As the D. C. plate current decreases the saturation of the transformer core also decreases to increase the coupling of the primary and secondary windings. The impedance of the secondary winding also increases so that the servomotor is no longer damped and will be operated at high speed. When the peak value of the signal voltage appearing across the grid resistor equals the cathode bias voltage of the tube 82, the effective direct current in the primary winding 89 is nearly zero. For the maximum signal voltage the effective output impedance of the transformer secondary winding 95 is designed to be equal to the full load impedance of the servomotor 12, with the result that matched impedances are provided, resulting in a maximum power transfer.

Upon decrease in the value of the error signal voltages as the receiver rotor 21 is driven to its null position, the effective D. C. component of the plate current in the primary winding 89 increases, to decrease the impedance of the transformer secondary winding 95. The operation of the servomotor tends to be increasingly damped due to the increasing mismatch of transformer secondary to motor variable phase.

When the null position for the receiver rotor 21 is reached, the short circuited condition of the motor is again attained, braking the motor to a standstill in the null position, without overrunning the null to produce an error signal of opposite sense.

Through suitable design of the air gap of the transformer 90, the static plate current flowing in the primary winding will saturate the core to a degree which lowers the effective impedance of the transformer when viewed from the secondary winding terminals. It has been found that such a transformer whether the core be E-shaped or L-shaped when provided with an air gap of .005 inch, as compared to the normal air gap of .025 or .030 inch, will when operated as described, result in the control of the servomotor in response to error voltages without oscillation or hunting about the null position, due to the motor coasting through the null position.

Alternately, the D. C. saturating voltage may be provided by diode rectification of the amplified error signal, opposed by a fixed rectified D. C. potential and the resultant D. C. applied to a tertiary winding of the output transformer 90. In which case, the increase of grid input signal voltage will subtract D. C. current (through the signal rectifying diode), from no signal fixed value of rectified voltage from the second diode, thus the algebraic sum of the two rectified voltages, when applied to the tertiary winding will reduce the core saturation.

It is understood that suitable cathode bias changes are incorporated to operate the beam power tube strictly on the linear portion of its $e_g$—$i_p$ characteristic under the above described alternate means of providing variable saturation.

It will thus be seen that there is provided an improved damping control for a servomotor in which the several objects of this invention are achieved and which is well adapted to meet the conditions of particular instrument application.

As various possible embodiments of the above invention may be made, and as various changes may be made in the embodiment above described, it will be understood that all matter herein set forth, or shown in the accompanying drawing is to be interpreted as illustrated and not in a limiting sense.

Having thus described my invention, I claim as new and desire to secure by Letters Patent:

1. A control system comprising a displacement signal transmitter, a signal receiver adapted to develop an error signal upon positional disagreement of said receiver with said transmitter, a motor adapted to drive said receiver into positional agreement with said transmitter, means interconnecting said receiver and said motor for operating said motor in response to said error signals, said means including in the output thereof and connected to said motor an inductive coupling having a core; and means included in said interconnecting means for saturating the core of said inductive coupling under no signal condition to brake said motor.

2. A control system comprising a displacement signal transmitter, a signal receiver adapted to develop an error signal upon positional disagreement of said receiver with said transmitter, a motor adapted to drive said receiver into positional agreement with said transmitter, means interconnecting said receiver and said motor for operating said motor in response to said error signals, said means including in the output thereof and connected to said motor an inductive coupling having a core; and means included in said interconnecting means for saturating the core of said inductive coupling under no signal condition to brake said motor, the saturation of said core decreasing as the error signal amplitude increases from the no signal condition to reduce the braking of said motor.

3. A control system comprising a displacement signal transmitter, a signal receiver adapted to develop an error signal upon positional disagreement of said receiver with said transmitter, a motor adapted to drive said receiver into positional agreement with said transmitter, an electronic circuit receiving said error signals, an output transformer for said circuit and connected to said motor, means for providing a bias in said circuit to permit a saturating current to flow in said transformer under no signal condition to decrease the impedance thereof, the decrease in impedance braking said motor.

4. A control system comprising a displacement signal transmitter, a signal receiver adapted to develop an error signal upon positional disagreement of said receiver with said transmitter, a motor adapted to drive said receiver into positional agreement with said transmitter, an electronic circuit receiving said error signals, an output transformer for said circuit and connected to said motor, means for providing a bias in said circuit to permit a saturating current to flow in said transformer under no signal condition to decrease the impedance thereof, the decrease in impedance braking said motor, an increase in the amplitude of the signal voltage from no signal condition increasing said bias to decrease the saturating current thereby increasing the impedance of said transformer to reduce the braking of said motor.

5. A control system comprising a displacement signal transmitter, a signal receiver adapted to develop an error signal upon positional disagreement of said receiver with said transmitter, a motor adapted to drive said receiver into positional agreement with said transmitter, an electronic circuit receiving said error signals, an inverse feed back in said circuit for attenuating the harmonics of said signals, an output transformer for said circuit and connected to said motor, means for providing a bias in said circuit to permit a saturating current to flow in said transformer under no signal condition to decrease the impedance thereof, the decrease in impedance braking said motor, an increase in the amplitude of the signal voltage from no signal condition increasing said bias to decrease the saturating current thereby increasing the impedance of said transformer to reduce the braking of said motor.

6. A control system comprising a displacement signal transmitter, a signal receiver adapted to develop an error signal upon positional disagreement of said receiver with said transmitter, a two phase induction motor adapted to drive said receiver into positional agreement with said transmitter, said motor having an excited phase, and an excitable phase; an electronic circuit receiving said error signals, an output transformer for said circuit connected across said excitable phase, the impedance of said transformer matching the impedance of said motor under full load; means for providing a bias in said circuit to permit a saturating current to flow in said transformer to decrease the impedance thereof, the decrease in impedance braking said motor.

7. A control system comprising a displacement signal transmitter, a signal receiver adapted to develop an error signal upon positional disagreement of said receiver with said transmitter, a two phase induction motor adapted to drive said receiver into positional agreement with said transmitter, said motor having an excited phase, and an excitable phase; an electronic circuit receiving said error signals, an inverse feed back in said circuit for attenuating the harmonics of said signals, an output transformer for said circuit connected across said excitable phase, the impedance of said transformer matching the impedance of said motor under full load; means for providing a bias in said circuit to permit a saturating current to flow in said transformer to decrease the impedance thereof, the decrease in impedance braking said motor, an increase in the amplitude of the signal voltage from no signal condition increasing said bias to decrease the saturating current thereby increasing the impedance of said transformer to reduce the braking of said motor.

8. A control system comprising a displacement signal transmitter, a signal receiver adapted to develop an error signal upon positional disagreement of said receiver with said transmitter, a two phase induction motor adapted to drive said receiver into positional agreement with said transmitter, said motor having an excited phase and an excitable phase; an error signal amplitude limiter connected to said receiver including an inverse feedback to attenuate the harmonics of said signal, an amplifier stage, an impedance transformer interconnecting said limiter and said amplifier stage, and a transformer in the output of the amplifier stage connected across the excitable phase of said motor, said amplifier stage having a low bias to permit a D. C. saturating current to flow under no signal condition for saturating the core of said transformer to brake said motor.

9. A control system comprising a displacement signal transmitter, a signal receiver adapted to develop an error signal upon positional disagreement of said receiver with said transmitter, a two phase induction motor adapted to drive said receiver into positional agreement with said transmitter, said motor having an excited phase and an excitable phase; an error signal amplitude limiter connected to said receiver including an inverse feedback to attenuate the harmonics of said signal, an amplifier stage, an impedance transformer interconnecting said limiter and said amplifier stage, and a transformer in the output of the amplifier stage connected across the excitable phase of said motor, the impedance of said transformer matching the impedance of said motor under full load; said amplifier stage having a low bias to permit a D. C. saturating current to flow under no signal condition for saturating the core of said transformer to lower the impedance of said transformer effectively short circuiting said excitable phase to brake said motor.

10. A control system comprising a displacement signal transmitter, a signal receiver adapted to develop an error signal upon positional disagreement of said receiver with said transmitter, a two phase induction motor adapted to drive said receiver into positional agreement with said transmitter, said motor having an excited phase and an excitable phase; an error signal amplitude limiter connected to said receiver including an inverse feedback to attenuate the harmonics of said signal, an amplifier stage, an impedance transformer interconnecting said limiter and said amplifier stage, and a transformer in the output of the amplifier stage connected across the excitable phase of said motor, the impedance of said transformer matching the impedance of said motor under full load; said amplifier stage having a low bias to permit a D. C. saturating current to flow under no signal condition for saturating the core of said transformer to lower the impedance of said transformer effectively short circuiting said excitable phase to brake said motor, the increase in the amplitude of the error signal increasing the bias of said amplifier stage to increase the impedance of said transformer.

11. A control system comprising a displacement signal transmitter, a signal receiver adapted to develop an error signal upon positional disagreement of said receiver with said transmitter, a motor adapted to drive said receiver into positional agreement with said transmitter, and an amplifier circuit adapted to operate said motor in response to said signals; said circuit including an output transformer coupling said motor to said circuit, a fixed rectified D. C. potential for saturating said transformer to reduce the impedance thereof and means for rectifying the amplified error signal to oppose said D. C. potential to decrease the saturation of said transformer.

12. A motor control comprising means for developing signal voltages, an electronic circuit for amplifying said voltages, and a motor adapted to be operated in response to said signal voltages; said electronic circuit including an amplifier stage in the output thereof having a low bias to permit a large plate current to flow under no signal voltage conditions, the increase in signal voltages increasing the bias of said stage to decrease the plate current thereof, and a transformer coupling said stage to said motor, the large plate current saturating said transformer to brake said motor under no signal voltage condition.

13. A motor control comprising means for developing signal voltages, an electronic circuit for amplifying said signals, a transformer in the output of said circuit, a motor coupled to said circuit by said transformer adapted to be operated in response to the developed signals, said circuit including a degenerative circuit for eliminating the harmonics in said signal voltages, and an amplifier stage in the output thereof having a low bias to permit a large plate current to flow under no signal voltage conditions, the increase in signal voltages increasing the bias of said stage to decrease the plate current thereof, the large plate current saturating said transformer to brake said motor under no signal conditions.

14. A motor control comprising means for developing signal voltages, an electronic circuit for amplifying said signals, a transformer in the output of said circuit, a motor coupled to said circuit by said transformer adapted to be operated in response to the developed signals, said circuit including a degenerative circuit for eliminating the harmonics in said signal voltages, and an amplifier stage in the output thereof having a low bias to permit a large plate current to flow under no signal voltage conditions, the increase in signal voltages increasing the bias of said stage to decrease the plate current thereof, the large plate current saturating said transformer to brake said motor under no signal conditions, the braking of said motor decreasing as the bias increases due to the increase in signal voltages.

15. A motor control comprising means for developing signal voltages, an electronic circuit for amplifying said voltages, and a motor adapted to be operated in response to said signal voltages; said electronic circuit including an amplifier stage in the output thereof having a low bias to permit a large plate current to flow under no signal voltage conditions, the increase in signal voltages increasing the bias of said stage to decrease the plate current thereof, and a transformer coupling said stage to said motor, the impedance of said motor under full load being equal to the impedance of the transformer, the large plate current saturating said transformer to brake said motor under no signal voltage condition.

16. A motor control comprising means for developing signal voltages, an electronic circuit for amplifying said signals, a transformer in the output of said circuit, a motor coupled to said circuit by said transformer and adapted to be operated in response to the signal voltages, the impedance of said motor under full load being equal to the impedance of the transformer; said electronic circuit including an amplifier stage in the output thereof having a low bias to permit a large plate current to flow under no signal voltage condition to saturate the core of said transformer thereby reducing the impedance thereof to brake said motor, the increase in signal voltages increasing the bias of said stage to decrease the plate current as the amplitude of the signal voltages increases decreasing the saturation of said core tending to match the impedance of said transformer with that of said motor.

17. A motor control comprising means for developing signal voltages, an electronic circuit for amplifying said signals, a transformer in the output of said circuit, a motor coupled to said circuit by said transformer and adapted to be operated in response to the signal voltages, the impedance of said motor under full load being equal to the impedance of the transformer; said electronic circuit including a degenerative feed back circuit for attenuating the harmonics in said signal voltages and an amplifier stage in the output thereof having a low bias to permit a large plate current to flow under no signal voltage condition to saturate the core of said transformer thereby reducing the impedance thereof to brake said motor, the increase in signal voltages increasing the bias of said stage to decrease the plate current as the amplitude of the signal voltages increases decreasing the saturation of said core tending to match the impedance of said transformer with that of said motor.

ADOLPH WARSHER.

REFERENCES CITED

The following references are of record in the file of this patent:

UNITED STATES PATENTS

| Number | Name | Date |
|---|---|---|
| 2,306,479 | Jones | Dec. 29, 1942 |
| 2,385,447 | Jones | Sept. 25, 1945 |
| 2,414,430 | Misbet | Jan. 14, 1947 |